(12) United States Patent
Blenkinsopp et al.

(10) Patent No.: US 11,181,232 B2
(45) Date of Patent: Nov. 23, 2021

(54) ENHANCED SAFETY ATTACHMENT FOR CUTTING MACHINE

(71) Applicant: KANDO INNOVATION LIMITED, Auckland (NZ)

(72) Inventors: Keith Blenkinsopp, Auckland (NZ); Niven Rhys Brown, Auckland (NZ); Nicholas Leon Hildreth, Auckland (NZ); Shaun Hurd, Auckland (NZ); Donald Oxley, Auckland (NZ); Winston Duang Wickham, Auckland (NZ); Jonathan Tee Wrigley, Auckland (NZ)

(73) Assignee: KANDO INNOVATION LIMITED, Auckland (NZ)

( * ) Notice: Subject to any disclaimer, the term of this patent is extended or adjusted under 35 U.S.C. 154(b) by 0 days.

(21) Appl. No.: 16/300,136

(22) PCT Filed: Apr. 24, 2017

(86) PCT No.: PCT/NZ2017/050044
§ 371 (c)(1),
(2) Date: Nov. 9, 2018

(87) PCT Pub. No.: WO2017/196187
PCT Pub. Date: Nov. 16, 2017

(65) Prior Publication Data
US 2019/0145577 A1   May 16, 2019

(30) Foreign Application Priority Data
May 12, 2016   (NZ) .................................. 720046

(51) Int. Cl.
*F16P 3/14* (2006.01)
*A22C 17/00* (2006.01)
(Continued)

(52) U.S. Cl.
CPC .......... *F16P 3/142* (2013.01); *A22C 17/0006* (2013.01); *B27G 19/06* (2013.01);
(Continued)

(58) Field of Classification Search
CPC ...... Y10T 83/081; Y10T 83/099; Y10S 83/01; F16P 3/14; F16P 3/142;
(Continued)

(56) References Cited

U.S. PATENT DOCUMENTS 5,272,946 A   12/1993   McCullough et al.
7,924,164 B1   4/2011   Staerzl
(Continued)

FOREIGN PATENT DOCUMENTS

| FR | 2703943 A1 | 10/1994 |
| WO | 2016/032345 A1 | 3/2016 |
| WO | 2016/049690 A1 | 4/2016 |

OTHER PUBLICATIONS

International Search Report and Written Opinion, dated Jul. 31, 2017, from corresponding PCT application No. PCT/NZ2017/050044.

*Primary Examiner* — Evan H MacFarlane
(74) *Attorney, Agent, or Firm* — Nixon & Vanderhye (57) ABSTRACT

The safety attachment provides preferably 4 video cameras mounted around a bandsaw blade and looking parallel to the blade direction. Each camera CCD sensor is partly scanned in mode 1. In mode 1 an axis corner of each scanned area is aligned with the camera axis, produced to the table, defining a corner of a parallel-sided protected volume including the entire exposed blade. The blade is rapidly braked when the attachment detects a glove intrusion. In the alternative fully scanned mode 2 the protected area extends outside the mode 1 area and a warning only is emitted on intrusion.

6 Claims, 4 Drawing Sheets

(51) Int. Cl.
*B27G 19/06* (2006.01)
*B26D 7/24* (2006.01)
*B26D 1/46* (2006.01)

(52) U.S. Cl.
CPC ............... *A22C 17/00* (2013.01); *B26D 1/46* (2013.01); *B26D 7/24* (2013.01)

(58) Field of Classification Search
CPC ...... F16P 3/141–148; F16P 3/00; F16P 3/008; A22C 17/00; A22C 17/0006; B27G 19/00; B27G 19/02; B27G 19/06; B26D 1/46–543; B26D 5/007; B26D 7/22; B26D 7/24; B23Q 11/00; B23Q 11/0078; B23Q 11/0082; B23Q 11/0089; B23Q 11/0092; B23Q 11/06; B23Q 17/2409; B23Q 17/249; G05B 19/048; G06T 7/0004; G06T 7/0008
USPC .................. 83/58, 68, DIG. 1; 382/141
See application file for complete search history.

(56) References Cited

U.S. PATENT DOCUMENTS

| | | | | |
|---|---|---|---|---|
| 8,311,661 | B2 * | 11/2012 | Krapf | B23D 59/001 700/174 |
| 8,386,067 | B2 * | 2/2013 | Krapf | B23Q 11/0082 700/174 |
| 8,615,320 | B2 * | 12/2013 | Krapf | B23D 59/001 700/174 |
| 8,988,527 | B2 * | 3/2015 | Haussmann | F16P 3/14 348/153 |
| 10,302,251 | B2 * | 5/2019 | Merx | G05B 9/02 |
| 2002/0061134 | A1 * | 5/2002 | Cofer | G08B 13/19606 382/181 |
| 2003/0234347 | A1 * | 12/2003 | Akagi | G08B 13/19697 250/221 |
| 2004/0200329 | A1 * | 10/2004 | Sako | B23D 59/001 83/58 |
| 2005/0207618 | A1 * | 9/2005 | Wohler | B25J 9/1674 382/103 |
| 2006/0197020 | A1 * | 9/2006 | Trzecieski | A22B 5/163 250/342 |
| 2007/0085502 | A1 * | 4/2007 | Graves | F16P 3/142 318/364 |
| 2009/0301275 | A1 * | 12/2009 | Jung | B23Q 11/0082 83/58 |
| 2010/0011926 | A1 * | 1/2010 | Murakami | B23D 59/001 83/58 |
| 2010/0212466 | A1 * | 8/2010 | Stellmann | B23Q 11/0082 83/63 |
| 2011/0041660 | A1 * | 2/2011 | Wingbermuehle | B23Q 11/0082 83/13 |
| 2011/0167970 | A1 * | 7/2011 | Niehsen | F16P 3/14 83/13 |
| 2011/0277609 | A1 * | 11/2011 | Visel | B23D 59/001 83/365 |
| 2012/0081537 | A1 | 4/2012 | Arcand et al. | |
| 2012/0123563 | A1 * | 5/2012 | Drinkard | F16P 3/144 700/13 |
| 2015/0144582 | A1 * | 5/2015 | Ford | B66C 15/045 212/276 |
| 2015/0217421 | A1 * | 8/2015 | Gass | B23Q 17/2438 83/58 |
| 2017/0219708 | A1 * | 8/2017 | Gebauer | G01S 7/481 |
| 2017/0227163 | A1 | 8/2017 | Campbell | |
| 2017/0252939 | A1 | 9/2017 | Blenkinsopp et al. | |
| 2019/0018382 | A1 * | 1/2019 | Elkmann | G08B 21/22 |

\* cited by examiner

ENHANCED SAFETY ATTACHMENT FOR CUTTING MACHINE

FIELD

This invention relates to powered machines of the type in which an operator pushes material to be cut or disassembled toward an active or hazardous region. Examples are motorized saws, and in particular to band saws. This invention provides safety shut-down means for the powered machine, including. In particular this invention provides hazard detection means, connected to rapid response means, as attachments for a band saw machine in order that motion of the cutting blade is arrested before contact or a close approach by a person's hands.

DEFINITIONS

A corner edge as used herein refers to a boundary of a solid geometrical shape where two surfaces intersect. As used herein a corner edge is oriented vertically in expected applications and forms a boundary of a surveilled volume or "exclusion zone".

Figure 4:
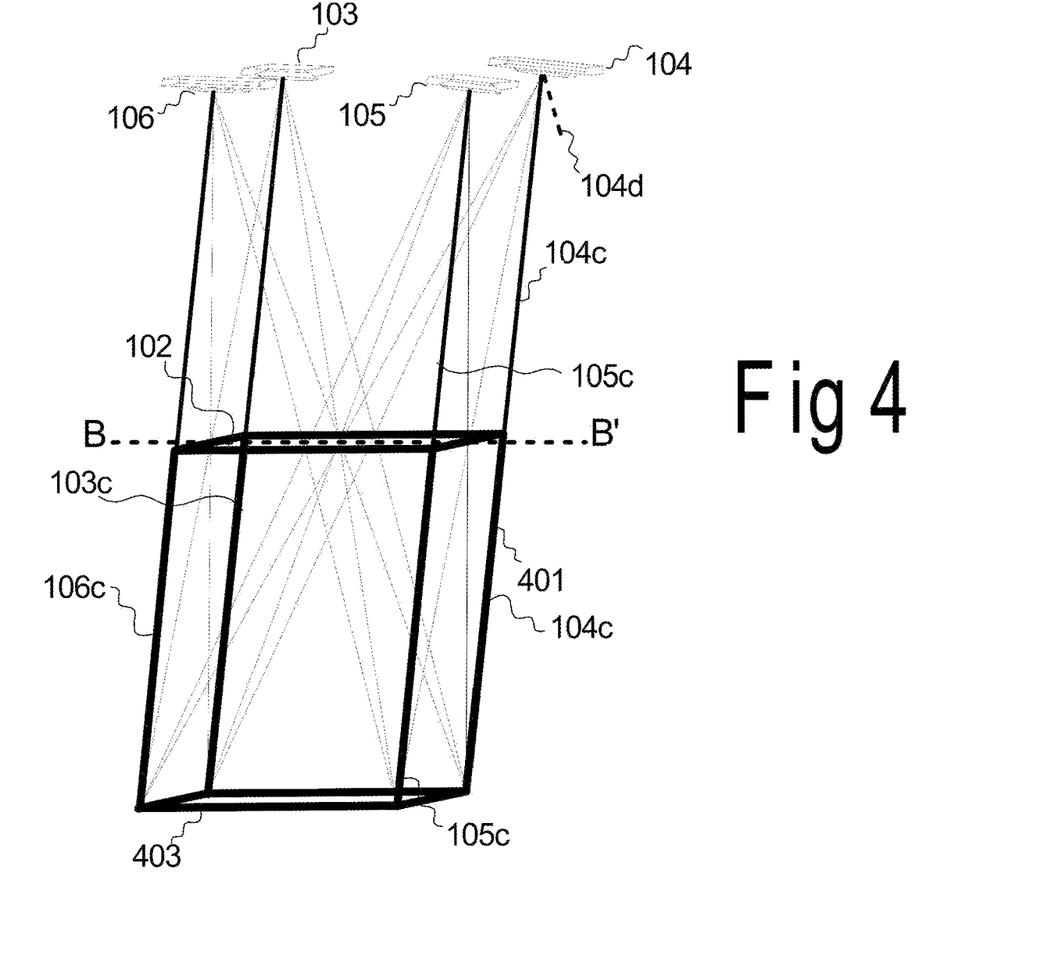
FIG. 4: is a perspective diagram showing an array of four cameras above the exclusion cuboid, showing that all cameras view the base of the cuboid.

An exclusion cuboid is a virtual, protected volume created electronically, as shown in perspective in three dimensions in FIG. 4. A cuboid is a variant of a cube having unequal dimensions for different sets of sides.

CCD is used herein to refer to the image-receptive surface inside an electronic camera.

BACKGROUND

A cutting machine could damage parts of a human body, such as the hands, just as easily as it cuts wood or meat. The machine operator pushes items to be cut up against the blade of the machine, often on a repetitive basis. A bandsaw, widely used in meat packing factories for cutting carcasses of meat is a particular instance of a dangerous cutting machine and bandsaw accidents do occur.

The present invention comprises an attempt to make a fully effective safety attachment based on "video curtain" protection principles and improved blade arrest means in combination. Previous solutions do not reliably cover the full height of an exposed cutting blade, and associated blade stopping is primitive.

PRIOR ART

PCT/NZ2015/050121 to the present Applicants describes three-dimensional (3D) detection by processing output of a pair of video cameras arranged to give stereoscopic (human-like) vision of a volume to be protected. Digital processing in real time resolved X, Y and Z co-ordinates for the recognised gloved hand, if present within a protected volume around the cutting blade. The operator wears blue latex gloves—a colour that is usually worn in any case as a food hygiene measure. The document describes how the bandsaw is stopped at a controlled rate after being decoupled from the drive and idler wheels. As a result, the blade is not usually damaged by the stopping procedure even though it is brought to a stop fast enough to prevent glove contact with a moving blade.

Use of a coloured glove (such as red or blue) together with a video curtain and a simple thresholding operation (using a video comparator or similar) is known. US 2012/0081537 describes protection of the operator area at a brake press. At least one camera was specified but the numbers may vary; 2, 3, 4 or more. How a number of video cameras improved the results from one camera was unclear. The document was silent on processing methods and the time to halt the brake press.

U.S. Pat. No. 7,924,164 discloses, for a band saw, the concept of "thresholding the image" and used the positions of the various protected zones as defined by scan signal timing to interpret the television frame from a single video camera focused on the table surface. The single image was treated as an X-Y matrix. No treatment of the height axis was described. Means for bringing the blade to a stop were not described.

A group including U.S. Pat. No. 5,272,946 and FR2703943 plus commercial products provide a worker with non-optical hand protection, namely electrical conduction between a metal or chain-mail glove and the bandsaw blade is used. Extremely fast blade braking activity is needed if hand damage is to be avoided under that system but it appears that there is not enough time to bring the blade to a halt. Electrical noise or glove disconnection can affect detection of contact.

PROBLEM

There is a need to prevent injury to personnel such as meat industry workers who are liable to receive severe and career-damaging injuries to their hands while using bandsaws to cut and trim meat.

OBJECT

An object of this invention is to provide an optical monitoring system for preventing damage to operators' hands by motor-driven cutting or crushing tools, especially bandsaw blades by ensuring a reliably delineated protection volume, together with adequate but not excessive braking means, or at least to provide the public with a useful choice.

STATEMENT OF INVENTION

In a first broad aspect the invention provides a safety attachment for a powered cutting machine having a toothed blade (101) and a cutting axis, a safety attachment using at least two video cameras each having an optical axis and a device (CCD) located at a plane of focus of a lens wherein the safety attachment includes that the cameras are disposed beside the blade and about the blade; each camera having an optical axis directed toward a cutting area and parallel to the cutting axis of the blade; the CCD of each camera has a first image receptive area located about the optical axis; said image receptive area encompassing a second, smaller image receptive area situated to one side of the optical axis and positioned so that, when in use, the second image receptive area receives an image derived from a volume bordered along one corner edge by the optical axis and including the cutting axis of the blade; wherein a first mode of operation (M1) of the safety attachment employs the second receptive image area of the CCD and a second mode of operation (M2) employs the first receptive area as a source of a video output; analysis means (FIG. 3) is provided having a video input for each camera and is configured to be capable, when in use, of monitoring the video inputs and of responding to presence of a distinctively coloured object represented in any one or more of the video inputs by producing an actuator activating signal (207); a first actuator is provided comprising blade braking means that is enabled during the first mode of operation; and a second actuator is provided comprising blade proximity warning means that is enabled during the second mode of operation.

Preferably the safety attachment determines the size of the image receptive area of the or each CCD by controlling a size of a readout from the or each CCD according to a current mode of operation.

Preferably about a quarter of the CCD is used in the first mode, while the entire CCD is used in the second mode.

Preferably a transition from one mode to another is instantaneous.

Preferably the powered cutting machine is a bandsaw.

In a related aspect, a composite effect of use of four cameras (103, 104, 105, 106) when in the first mode of operation is that a first working volume or exclusion cuboid (107) is created; the exclusion cuboid having a base upon a table that defines a work surface (403) of the bandsaw and extending upward to a working height and having sides bordered along each of four corner edges, each of which is defined by the corresponding optical axis (103c, 104c, 105c, 106c) of each of the four cameras; and the volume of the exclusion cuboid only is monitored for presence of the distinctively coloured object and a first actuator comprising blade braking means is actuated if the distinctively coloured object is detected, and a composite effect of use of the four cameras when in the second mode of operation is that a second volume (108) including and extending outward beyond the sides of the exclusion cuboid is created; the second volume is monitored for presence of the distinctively coloured object and a second actuator comprising machine operator warning means is actuated if the distinctively coloured object is detected.

In a subsidiary aspect the distinctively coloured object comprises hand protection; namely that the machine operator wears blue gloves of rubber or latex in order that the operator's hands comprise a distinctly coloured object having adequate optical contrast against expected background hues.

Preferably the base of the cuboidal protected volume in mode 1 extends by a predetermined distance to the left, to the right, in front of, and behind the position of the blade, and the height extends vertically upward from the table to include the entire exposed portion of the bandsaw blade inside a protected volume having vertical sides defined by corner edges each of which is defined by the corresponding optical axis of each cameras.

In a related aspect the cuboidal protected volume extends 40 mm to the left, to the right, in front of, and behind the position of the blade and has a height of 400 mm.

In a first option, each lens of each camera is laterally displaced, in order that the effective optical axis of the camera is laterally displaced diagonally across the CCD in order that more or less than a quarter of the area of the CCD is capable in use of collecting information from the cuboidal protected volume during Mode 1, and in order that the area of the protected volume can be altered yet retaining vertical sides.

In a second option, at least one optical axis is deflected by a mirror and at least one camera is mounted horizontally.

Preferably each camera, or each mirror, is situated behind a transparent, protective window and each window is cleaned from time to time by a jet of air emitted from an adjacent nozzle.

In a second broad yet central aspect, the SIGNAL is used as a bandsaw blade arrest procedure initiation signal including a first step of releasing the blade from contact with a drive wheel and an idler wheel by moving an axle of the idler wheel toward the drive wheel using an over-center idler wheel lock and released energy stored within a compression spring to cause motion, and a second step of forcing together a pair of brake pads with a braking pressure; one mounted on each side of the blade together using released energy stored within a compression spring to apply the braking pressure and preferably, the blade braking means employs an opposing pair of brake pads comprised of polymethyl methacrylate; each of the pair of brake pads has a contact length of 15 cm and a contact width of 8 mm; the brake pads are held apart by force from a solenoid during use, and the pressure applied during a braking process is about one thousand Newtons.

In a related aspect, when in Mode 1 the safety attachment is capable of making a fresh appraisal of the images seen by scanning the cameras at 3.2 ms intervals, and if a distinctively coloured object is detected in a scan, the blade is brought to a stop within substantially 20 ms of the start of the scan.

PREFERRED EMBODIMENT

The description of the invention to be provided herein is given purely by way of example and is not to be taken in any way as limiting the scope or extent of the invention. In particular the dimensions shown in one illustration are purely illustrative. The invention has been described in an illustrative manner, and it is to be understood that the terminology which has been used is intended to be in the nature of words of description rather than of limitation. The contents of PCT/NZ2015/050121 are included by reference.

In this specification, reference numerals, including reference numerals appearing in the Summary of Invention, are provided for clarification only and are not intended to restrict the scope of the invention to the particular embodiments of the components in conjunction with which the reference numerals are used.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps. It should be noted that "up" and "down" are used for convenience in relation to a preferred embodiment as described in Example 1. Other orientations are equally valid. Each document, reference, patent application or patent cited in this text is expressly incorporated herein in their entirety by reference. Reference to cited material or information cited in the text should not be understood as a concession that the material or information was part of the common general knowledge or was known in New Zealand or in any other country.

Figure 1A:
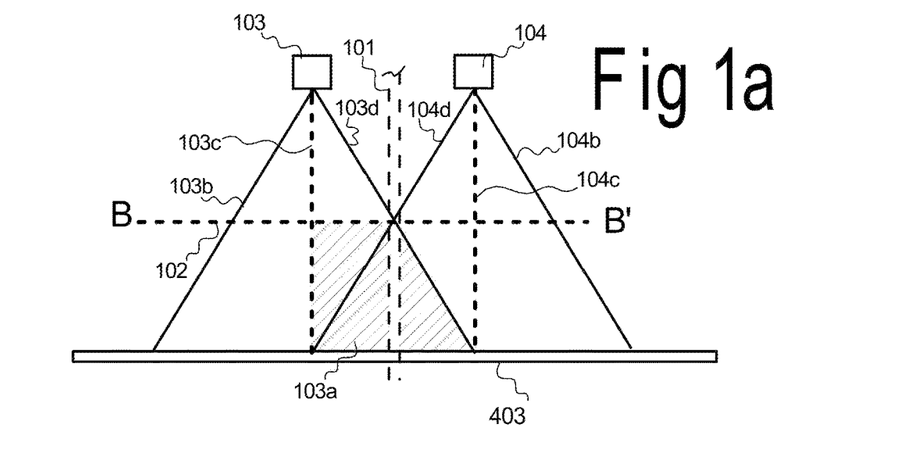
FIG. 1a: is an elevation view (along line A-A' of FIG. 2) showing generation of the exclusion cuboid with reference to the optical axis of each of two cameras. The portion of the cuboid that is seen by one camera is hatched.

Throughout this specification the term "vertical" is used because it accords with customary bandsaw use. The reader should be aware that the bandsaw example is non-limiting and a vertical axis as such is not a requirement of the invention. More particularly the axes of the machine vision system such as dashed lines 103c and 104c in FIG. 1a are best aligned parallel with the axis of the cutting blade 101. The use of the camera axis as a line defining a vertical should not be taken to exclude an exclusion volume with one or more non-vertical corner edges.

INTRODUCTION

The invention—the safety attachment—is a form of "video curtain". The invention ensures that the defined exclusion cuboid of Mode 1 cannot be shared by a machine operator's hand wearing a distinctive glove (a blue latex glove) and a moving bandsaw blade by making a SIGNAL for use by braking apparatus 208 when at least one camera has detected a hand inside the exclusion cuboid. The bandsaw, the example 1 cutting machine, is then halted so quickly that the blade is stopped before the hand can touch it. It is extremely unlikely that injury can be caused by the blade. (See FIGS. 8a and 8b). During the alternative Mode 2 a wider area is scanned so that the operator can be warned of proximity to the exclusion cuboid.

EXAMPLE 1

Figure 1B:
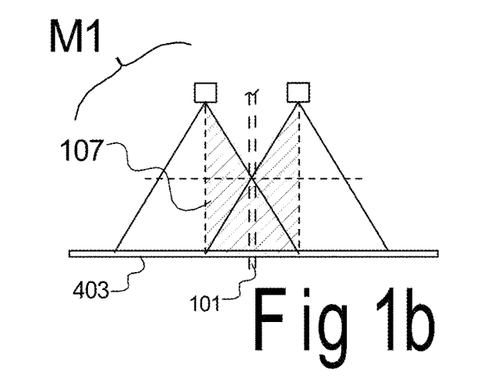
FIG. 1b: shows the restricted glove-sensitive area (107) when Mode 1 (M1) is in effect; in which 175 the exclusion cuboid has vertical sides.
Figure 2:
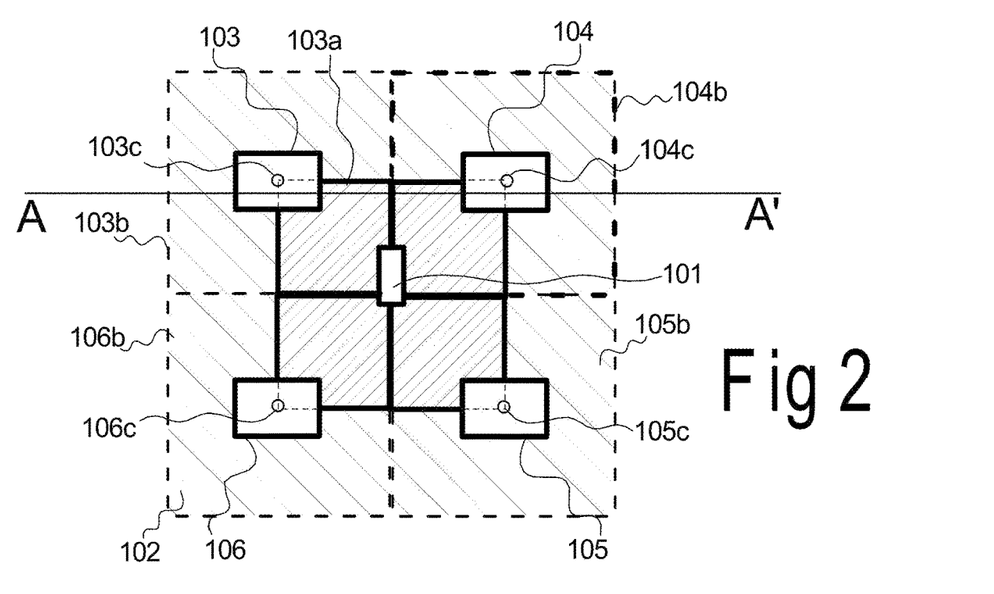
FIG. 2: is a plan view showing mapping of the exclusion cuboid on to four camera image-collecting areas with reference to the optical axis of each camera, from a plane at line B-B[1] of FIG. 1.

The invention avoids co-alignment of the optical axis with the line of the blade by using at least two cameras as shown in FIGS. 1a, 1b, and 2, one on each side of and with axes parallel to the blade axis and directed toward the cutting zone. Any number of cameras are preferably disposed symmetrically around the blade, such as in FIG. 5. Use of other than the preferred 4 cameras in total is discussed under "Variations". For each camera the potentially awkward overlap of the blade with any one camera's optical axis is resolved by offsetting the blade axis and supplementing the view with another camera. There are no blind spots within the exclusion zone.

The invention switches between two operational modes that vary the relative area of the camera CCDs that are scanned. Mode 1 (M1 in FIG. 1b) views a restricted "exclusion zone" or volume 107 about the blade, defined by limiting a CCD scan to a smaller part of the entire CCD image receptive area. Detection of a blue-gloved hand in Mode 1 will make the machine stop. The exclusion zone in this Example has vertical sides to help the machine operator know where it is and to make protection consistent over the full height of the exposed cutting blade. Mode 1 also has a fast readout, calculation and decision delay of 7-8 milliseconds (ms) since one quarter only of the CCD area of each camera is read out. Mode 2 (M2 in FIG. 1b) has a broader coverage (108) spreading beyond limits of the exclusion zone, since the entire CCD of each camera is read. Detection of a blue-gloved hand in Mode 2 causes a warning signal but no blade halt. The warning signal helps the operator know when the exclusion zone is approached. Typically, the apparatus will continually and rapidly switch between Mode 1 and Mode 2 perhaps a hundred times in a second, as for example 111211121112 . . . .

Mode 1.

A diagrammatic elevation view in FIG. 1a (which corresponds to a vertical cross-section aligned from A to A' in the plan view of FIG. 2) shows the field of view of downwardly directed camera 103, bordered by slanted field edges 103b and 103d, extended symmetrically to both sides of that camera's optical axis 103c and reaching to the work surface 403 of the illustrative example cutting machine, a bandsaw. Assuming a rectangular film or CCD as an image-collecting device inside the camera, the field of view may be described as a quadrilateral pyramid 103b-103d with the camera lens at the apex. Each lens is preferably focused in a plane about half way between plane B-B' and the work surface 403. The sharpness of edge resolution of an image at any height is enhanced by stopping the lens down to a small aperture, as is well known in the optical arts. The cutting blade 101 intersects one side of the quadrilateral pyramid. The focal length of the lens in combination with the image length and width determines the angle of slope of the sides which in practice is typically 5-10 degrees. FIG. 1a shows a second downwardly directed camera 104 having a second optical axis 104c and a second field of view 104b-104d also having the shape of a quadrilateral pyramid, centered on the other side of the blade 101.

A horizontal plane 102, identified as B-B' at the intersection of the fields of view of the two cameras shown represents a top limit of the fully protected volume. Above that plane neither camera can see all the space surrounding the blade 101 although the invention will respond to objects above the plane. Below that plane, both cameras can see around the blade with increasing overlap until the work surface 403 is approached. The plane B-B' may have a physical correlate such as an extended blade guide. The part of the restricted "exclusion zone" 103a seen by camera 103 when in Mode 1, thanks to restricted scanning of its CCD, is hatched in FIG. 1a. Part of that zone is shared with camera 104 which sees the other side of the blade 101.

How are the corner edges of the cuboidal exclusion zone in Mode 1 (M1) able to be defined as vertical? In Mode 1, the effective field of view of the safety attachment for both cameras is restricted to the hatched area 107 in FIG. 1b by making partial scans only of the image-collecting devices or CCDs, between a point corresponding to the optical axis and a corner of the chip. That is indicated in FIG. 2, where the close-hatched areas of the four cameras (103a for example) are the "second, smaller image-receptive areas". As a result, corner edges of the protected volume coincide with optical axes 103c, 104c, 105c, and 106c of the cameras 103, 104, 105, 106 as shown in FIGS. 1a and 1n FIG. 2. They inherently have vertical sides because the cameras are directed vertically in this Example. The hatched area 107 in elevation view FIG. 1b indicates the extent of the Mode 1 protected zone. Since more than two cameras are used, the protected space has a volume. The preferred four cameras create a cuboidal exclusion volume having vertical external edges along 103c, 104c, 105c and 106c.

Mode 2.

Figure 1C:
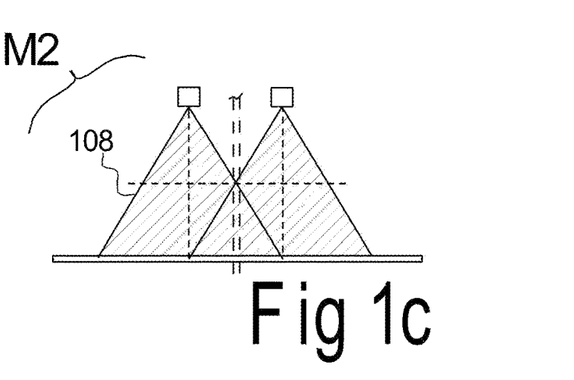
FIG. 1c: shows the broadened glove-sensitive area (108) when in Mode 2 (M2).

In Mode 2 (M2 as shown in FIG. 1c) all camera CCDs are scanned over the entire CCD area. The protected volume 108 now includes the outer sides of the quadrilateral pyramids. A different output, a proximity warning is produced on detection of a distinctive colour. Repeatedly switching scanning modes provides the safety attachment with a useful ability to warn the operator of closeness to the exclusion volume when in Mode 2 (second actuator) and an uncompromised ability to stop the machine in Mode 1 with the first actuator if the operator's hand enters the exclusion volume. An incidental benefit of Mode 2 is that it clears otherwise uncollected charges from cells of the CCD chip of each camera.

FIG. 2 diagrammatically shows the layout of the exclusion volume and surrounding area as a plan view (B-B') mapped on to the plane 102 that is shown in FIG. 1. The position of the bandsaw blade 101 is included. For example in camera 103, the more densely shaded area 103a is critically read and used when in Mode 1, while the lightly shaded area 103b is not used, being outside the exclusion cuboid. A similar chip-scanning arrangement, rotated on FIG. 2 in relation to the preceding camera, is used for cameras 104, 105 and 106 where the lightly shaded areas 104b, 105b and 106b indicate the borders of the Mode 2 protected area. The viewed volume for each camera is thereby converted from a quadrilateral pyramid having four sloping sides into a quadrilateral pyramid in which two sides are vertical and meet along an edge that comprises a corner edge of the protected volume and coincides with an effective optical axis of the camera above. By overlapping four CCD chip coverages, a cuboidal "certainly protected" volume is created that has four vertical corner edges each placed at a camera axis 103c, 104c, 105c, and 106c. The preferred vertical arrangement has the effect of defining the side surfaces of the exclusion cuboid without parallax errors since each surface is bounded by two corner edges, each of which is a vertical line aligned with one camera optical axis. For computational economy the side surfaces are preferably parallel to either an X or a Y axis of the camera chip. Readout line lengths could be made variable for particular reasons.

EXAMPLE 1A

Figure 5:
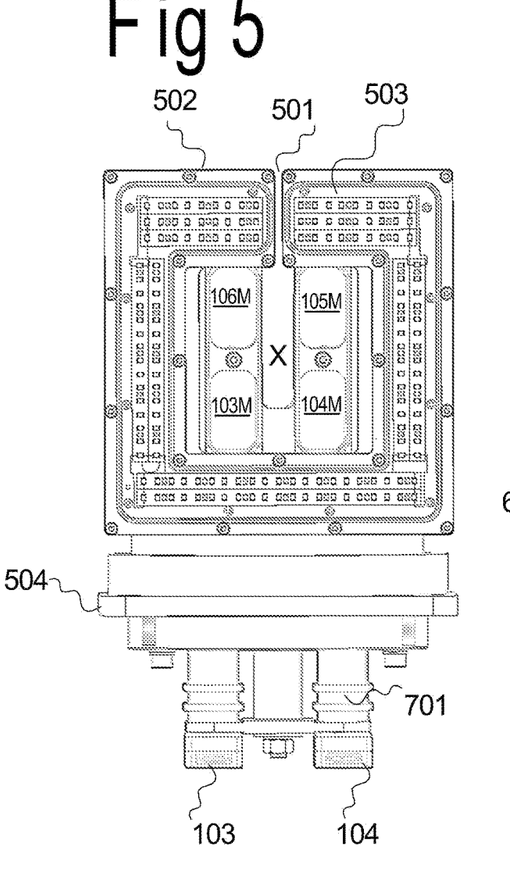
FIG. 5: shows the camera head assembly as seen from below.
Figure 6:
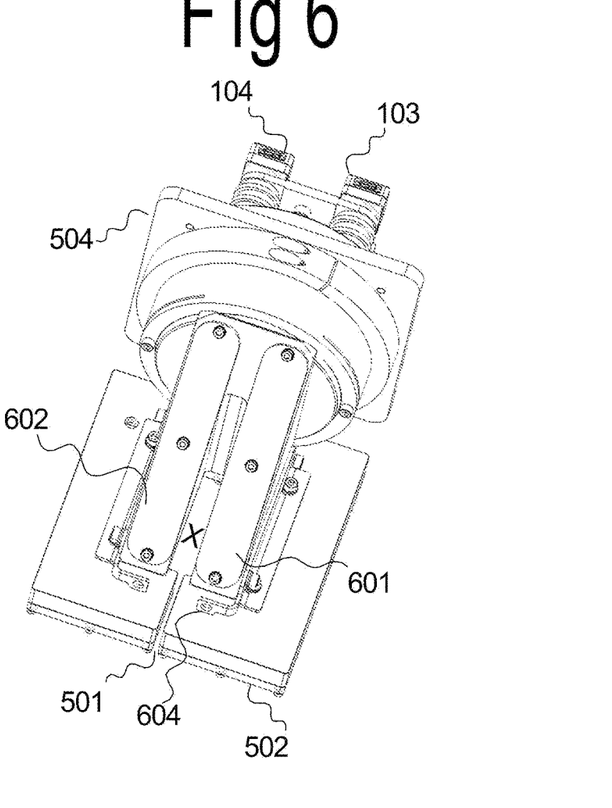
FIG. 6: shows the camera head assembly as seen obliquely from above.
Figure 7:
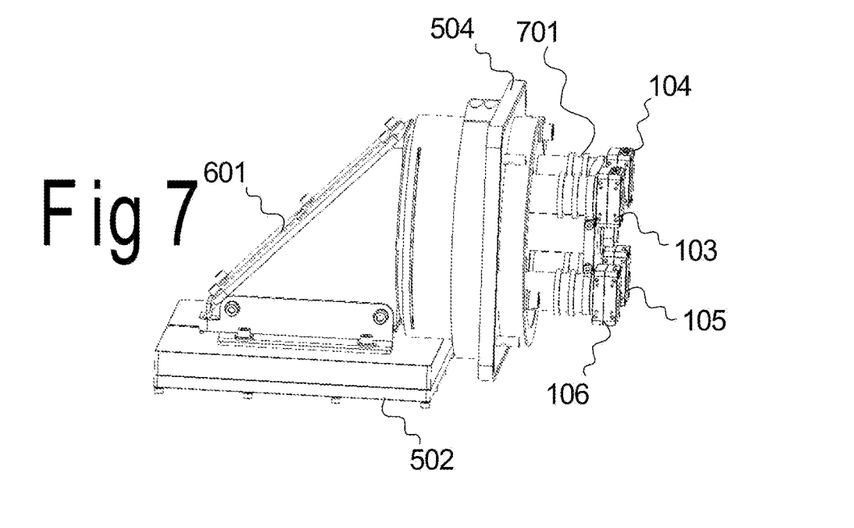
FIG. 7: shows the camera head assembly as seen obliquely from one side.

The FIG. 2 example cuboidal protected volume typically has an 80×80 mm area at the work surface 403; that is 40 mm in each orthogonal direction from the bandsaw blade 101; the same size also at 101, plane B-B. The example height (as per FIG. 1) between the work surface 403 and the plane 102 is 400 mm. Mirrors extend the optical distance between the camera lenses and the work surface, and shift the actual cameras 103, 104, 105, and 106 away from proximity to the blade 101, preventing collision of the cameras with the blade which whips sideways during braking. The cameras are mounted with horizontal axes. Their gaze is directed through two plane 45 degree mirrors inside mirror cells 601, 602 (as shown in FIGS. 6 and 7); one at each side of the bandsaw blade. The optical axes conveniently become vertical. FIG. 5 shows four effective view ports 103M, 104M, 105M, and 106M through two glass windows located symmetrically about the blade, located at X inside the rectangular space between the viewing windows. The windows are periodically cleaned of contaminants with air blasts emitted from nozzles held in fittings of which one is shown as 604. The windows are raised slightly above the light housing 502 and the space between is used for the air blasts. The saw blade itself is installed or replaced by passing it through the gap 501.

The working surface receives shadow-free illumination from beside the viewing windows from a number of downwardly directed white light-emitting diodes located behind a protective window 503. Light is provided at a high level in order to overcome reduction of CCD illumination as a consequence of using a small lens aperture, giving a desired large depth of field while retaining a low-noise output from the cameras. White light is also desirable for the operator's own vision.

A lens for each camera is selected with a focal length to suitably define the limits of the exclusion cuboid having regard for the dimensions of the CCD within the selected camera. At this time, the preferred colour camera is Point Grey (www.ptgrey.com) (BFLY-PGE-13E4C-CS (E2V EV76C560) which allows for partial or complete readings. Many other suitable brands and models also use Sony CCD 1280×1048 pixels chips.

The camera bodies are each supported by mounting tubes 701 upon a camera mounting plate 504, attached to existing hardware such as a bandsaw frame. In the prototype the optical axis for each camera is determined by mechanical alignment to lie along a corresponding vertical corner edge of the cuboid, while ensuring that the quarters of the respective CCDs cover contiguous or overlapping parts of the protected volume between the work surface 403 and the plane 102 (B-B). The line of sight of each camera extends off the mirrors and vertically down to the work-station surface. The invention thereby provides that the corner edges of the Mode 1 exclusion cuboid (401 in FIG. 4) are accurately definable as vertical lines; each one aligned with the optical axis of a corresponding camera.

FIG. 4 is a perspective view showing four cameras 103, 104, 105 and 106 and their active fields of view, in mode 1, that define the invisible exclusion cuboid 401 bounded by an upper surface or plane 102, a bottom surface (upon work surface 403) and four corner edges 103c, 104c, 105c and 106c. FIG. 1b shows a simplified elevation view of the safety attachment, contrasting Mode 1 (M1) and Mode 2 (M2) zones.

Processing Procedure.

Figure 3:
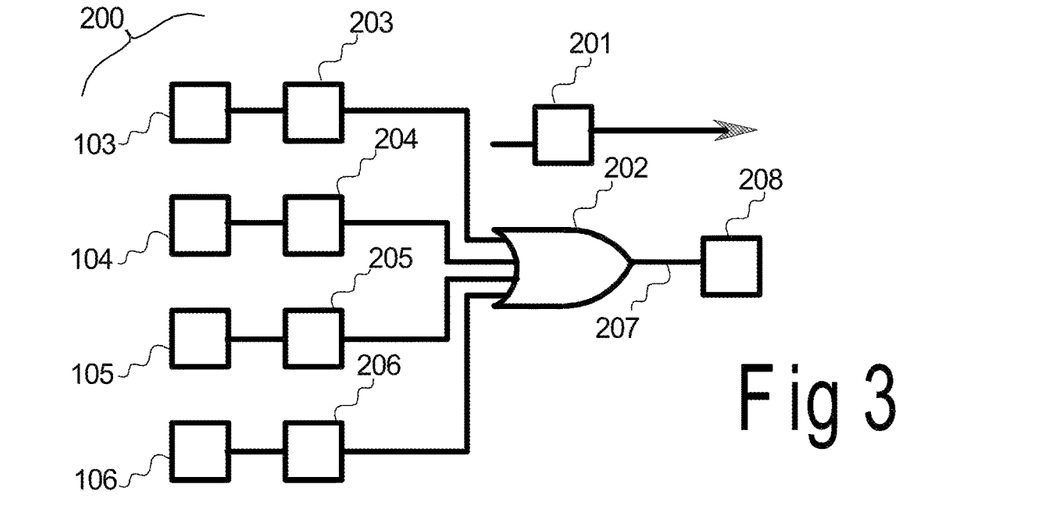
FIG. 3: is a block diagram to illustrate one logic option for signal aggregation.

When a blue glove invading the Mode 1 exclusion cuboid is seen by at least one of the cameras, signal processing of the camera outputs causes the apparatus to issue a "Brake Now Signal" (herein "SIGNAL" 207) to actuator machinery 208 that is capable of quickly stopping the blade. FIG. 3 is a highly schematic logic diagram summarising the processing of the video signals from cameras 103, 104, 105 and 106 through corresponding blue discriminator means 203, 204, 205 and 206, then to an OR logic gate 202. The output 207 of the gate is connected to an actuator 208. Note that no inter-channel computation is shown. The skilled reader will know to compare values of R G and B outputs of any one camera in analogue or digital form in order to discriminate blue at various light levels.

Processing may be carried out typically in an industrial Linux or Windows-compatible computer or equivalent, preferably one having an Intel i7® processor. C++ code is currently preferred. Many processor functions including switching between a mode 1 (M1) brake mode and a mode 2 (M2) alarm mode, carrying out and monitoring a test braking event at the start of each shift, and restoring operating positions of the brake and idler wheel axle have not been drawn as explicit flow diagrams.

FIG. 8 is a type of Gantt chart timing chart for mode 1 operation; time increases from left to right. At the left, the four cameras 103, 104, 105 and 106 are concurrently triggered to provide image data. One camera of the currently selected type performs image capture in 3.2 milliseconds (ms) and then frame acquisition/transfer takes 1 ms; meanwhile the next frame is being captured. One frame is processed within 3 to 4 ms within one functional thread of the processing device to test for presence of a blue glove. Processing is handled concurrently or as overlapping threads so that there is no lost time. The total time from a sighting to detection reporting—as a SIGNAL to cause blade arrest to begin—is 7-8 ms. It will be noted that a second image has been acquired and is ready for processing before analysis of the first frame has been completed. The cameras (as indicated on the top row (A-B-C-D . . . ) for camera 103, are continuously acquiring data at one frame every 3.2 ms or 312.5 times a second. Mode 2; periodically used as a wide-field survey, may be at least 4 times slower since all pixels, not the pixels from a quarter only of the CCD, are viewed. The skilled reader will realise that in Mode 2 the image data may for example be retrieved and handled as 2×2 bins which overcomes any timing difference between modes.

In case of false positives such as from image noise, tests for a breach of the exclusion cuboid include one or more of (a) finding a sufficient number of blue pixels in any one frame from any one camera, (b) finding a sufficient number of contiguous pixels for example in a 2×2, 3×3 or 5×5 array of blue pixels of a frame collected from any one camera, which is computationally easy to evaluate, and (c) optionally persistence of the contiguous pixels within a series of frames; which requires memory facilities to hold a frame over time. A decision can be quickly made for any one of the four cameras. If enough blue pixels are found, the real or emulated OR logic module 202 sends a SIGNAL along line 207 to an actuator 208 comprising electrically triggered bandsaw blade braking apparatus which is essentially that previously described by the Applicant in PCT/NZ2015/050121.

Block 201 in FIG. 3 indicates a network-compatible microprocessor for transmitting operational data to a remote supervisor; for example (a) continuous and repeated confirmation of safe operation including bandsaw motor, brake, brake testing, lighting, and processor operation, (b) transgression of the exclusion cuboid under Mode 1 by a blue glove, (c) timing information from every blade arrest instance, and (d) optionally transgression of the Mode 2 warning zone 108. Appropriate inputs to block 201 are not defined here. The prototype has been equipped with a motion sensor monitoring blade tooth passage detector as an independent indicator of blade motion. Block 201 may also serve as a local fail-safe device, directly causing brake 208 to be activated if "safe operation" cannot be assured.

Figure 8A:
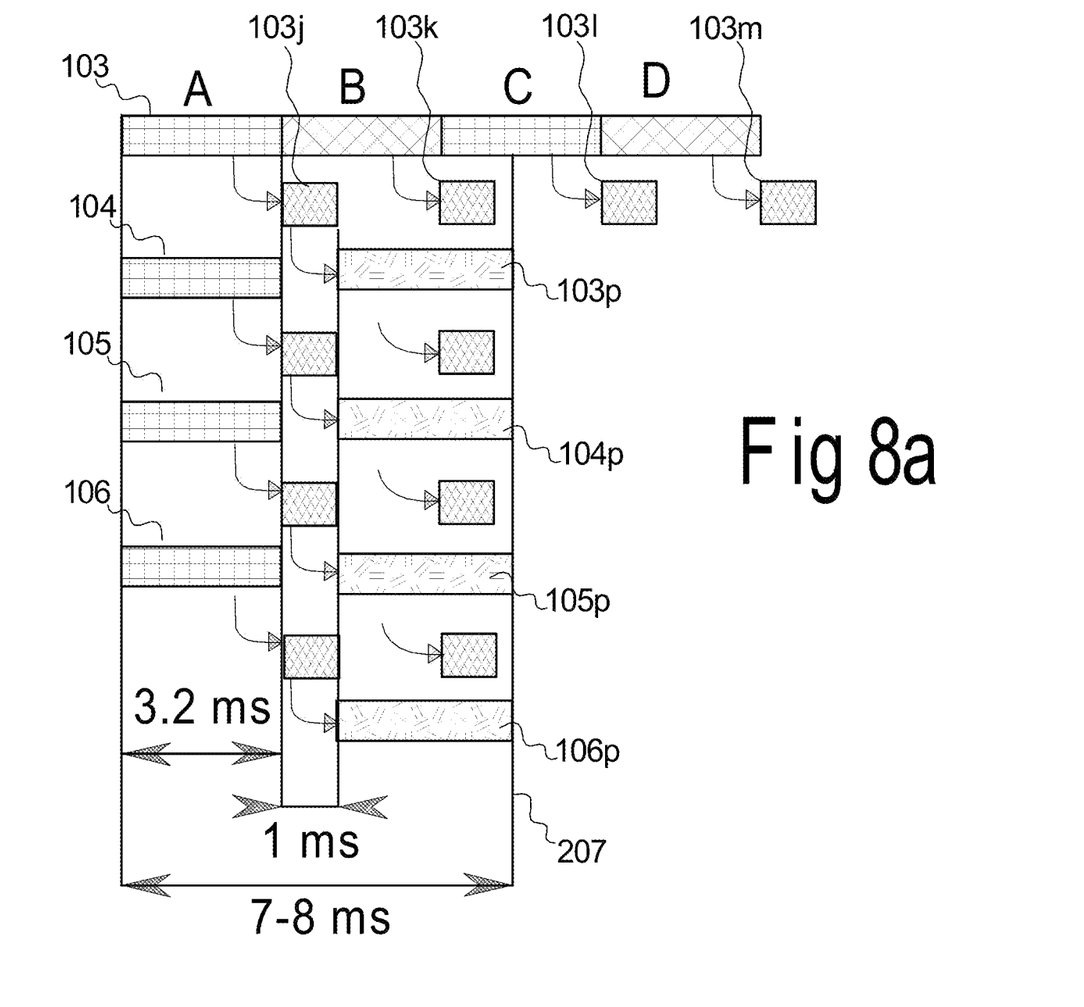
FIG. 8a: is a Gantt-type chart showing overlapping processing of images.
Figure 8B:
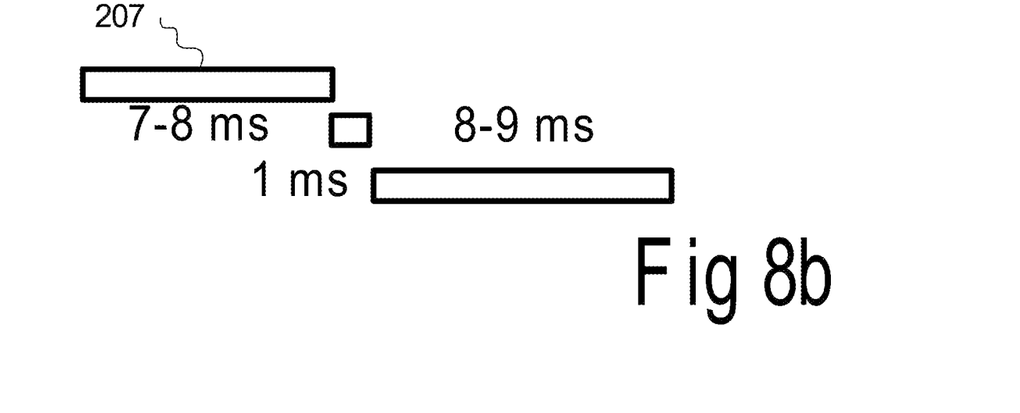
FIG. 8b: is a Gantt-type chart showing timing from one first detection to blade halt.

FIG. 8a is a Gantt chart and shows total reaction time for the enhanced safety attachment in terms of processing. Cameras 103, 104, 105 and 106 create video signals to be evaluated in parallel. For camera 103, these are transferred 103j, 103k, 103l and 103m over following intervals to processing means 103p. Other processors 104p, 105p and 106p are shown in FIG. 8a which correspond to parts 203-206 of FIG. 3. FIG. 8b shows timing of the braking mechanism in reaching a complete stop after a camera sees an object. Sequential steps include (a) vision processing as described herein (7-8 ms), 1 ms to transfer the SIGNAL 207 to the mechanical actuator (see PCT/NZ2015/050121), and 8 to 9 ms to allow the hold-open solenoid field to decay, let the brake to be applied by spring pressure, and a time for the blade to actually stop. The total time is around 20 ms; meanwhile fresh evaluations commence every 3.2 ms. The skilled reader will appreciate that since a bandsaw blade in use is already stretched into its Hookean region; too much extra tension during braking will permanently deform or break the blade. An instant halt is not realistic.

Mode 2 detection of blue gloves inside the outer hazard zone or warning space gives rise to data that can be used for (a) direct operator warnings such as an audible alarm or a flashing light to the operator; something that overcomes ambient noise and optionally (b) transmits warnings to a supervisor since frequent Mode 2 events may suggest that the person operating the bandsaw has become tired and is at risk of injury. FIG. 1b contrasts the smaller exclusion hatched cuboid 107 (M1 at left) and the surrounding hazard zone (shown in FIG. 1c as the hatched area 108 as M2 for mode 2. Full-frame data representing the surrounds of the hazard zone is captured by periodically switching between Mode 1 and Mode 2, perhaps 100 times in a second and M2 data is processed within a separate thread in the digital computer as currently used.

Variations:

Lens shift. The optical center of a camera's field of view is assumed to be symmetrical about the axis of rotation of the lens. Accordingly, a central location of each camera above a vertically directed corner edge of the exclusion cuboid is dictated by the construction of conventional cameras in order to place an optical axis. Instead, the lens need not be in the mechanical central axis of the camera, but displaced sideways on its lens board so that the effective optical axis is carried away from the CCD center. That allows the camera to be physically placed to one side of a line produced upward from an exclusion cuboid corner, and allows more efficient use of an existing CCD. For optimisation case by case, a smaller area of CCD may be read in Mode 1 and a larger area read in Mode 2, or vice versa. Of course, vertical edges to the exclusion zone may not be a preferred effect and the scanned area can be varied from the "one quarter chip with the chip center at one corner" situation as described, with or without lens displacement.

Number of cameras used. The Examples refers to a well-circumscribed cuboidal protected area generated using four cameras. As in FIG. 5 the cameras have symmetrically disposed views surrounding the blade X. If just two cameras were used, the Mode 1 exclusion volume would not have boundaries in an axis perpendicular to a line joining the cameras. That may be acceptable. If three cameras were placed at the corners of a triangle they would cover a three-sided pyramidal area but an extra mirror and window would be needed to provide an exclusion volume symmetrical with respect to the blade. Each line of data scanned from the CCDs would have a different length. It seems simpler to use four cameras in a symmetrical arrangement. The invention also applies to five cameras to protect a pentagonal area, or yet more cameras.

Processing means. At least parts 201-206 of FIG. 3 may comprise for example one or more microprocessors or other analogue devices, digital logic or a dedicated logic array. Field-programmable gate arrays (FPGA) are now under consideration, to provide the added reliability and security of having no operating system as such. If one or more processors having a proprietary operating system are used, the crucial short computation time should not be delayed by a priority interrupt arising from a non-relevant operating system action that supersedes the running program. Such an interrupt may be untraceable.

EXAMPLE 2

Clearly, exclusion zone breach detection alone is not enough to make the bandsaw safe. Effective blade braking is essential. This section describes two brake actuator improvements over those described in the Applicants' previous publication in PCT/NZ2015/050121, which is hereby imported in its entirety.

The original spring-loaded brake assembly had one brake using an opposing pair of tungsten carbide brake pads to press on the smooth sides of the steel bandsaw blade from both sides when the solenoid was released. Disadvantages of tungsten carbide include that some carbide brake pads failed over time by developing a fracture within the bearing surface which exhibited erosion as small pits. Material from within the pits was lost. Notably, the coefficient of kinetic friction of carbide on wet steel was low at about 0.1-0.2. Polymethyl methacrylate (PMMA, Acrylite®, Lucite®, Perspex®, Plexiglas®) has a coefficient of kinetic friction on wet steel of about 0.4, or on dry steel of about 0.5, which proved to be advantageous. PMMA pads having the same brake pad dimensions as the carbide pads (150 mm long; an 8 mm wide bearing surface with a 6 mm thick trapezoidal (in section) backing plate and a plain surface) were tested. Grooves across the braking surface for expulsion of water and contaminants may be preferred. Surprisingly, polymethyl methacrylate pads do not exhibit heat-related damage even after repeated use. In addition, the pressure used has been raised from 800 Newtons (N) to 1 kN. Under the relevant conditions any one braking event lasts for about 10 ms and is not 445 repeated for at least a minute.

With reference to FIG. 8b, the Gantt chart timeline includes any one camera detection to SIGNAL 207 production process of 7-8 ms (from FIG. 8a). 1 ms is allowed for SIGNAL transmission, then 8-9 ms is provided for bringing the blade to a halt; including the steps of solenoid decay times, bringing the idler wheel axis down so that the blade no longer grips the wheels, moving the brake pads into contact, and slowing then stopping the blade by friction applied to both sides of the non-toothed part of the blade using pads and pressure as described in this section. That is, one Mode 1 detection of a dangerous situation requires about 20 ms to effect a complete halt, in total. It should be noted that the apparatus carries out repeated camera scans every 3.2 ms which is an effective evaluation repetition rate.

The safety attachment retains the fail-safe features of the Applicants' PCT/NZ2015/050121, for example by using current flow to hold the brake pads open against 1 kN of spring pressure when in use, so that any kind of power failure directly causes blade arrest.

Results and Advantages

A powered bandsaw equipped with the safety attachment will not cut into an operator's hand wearing a blue glove visible from above when entering the controlled exclusion volume surrounding the cutting blade from the table to the full height of the exposed cutting blade. In response the blade is braked very quickly but not so quickly that the blade is damaged.

The processor produces a stopping SIGNAL 7-8 milliseconds after the glove comes into view. Since scanning and analysis overlap there is a new scan every 3.2 ms when in Mode 1. The vertical walls of the exclusion cuboid of this version of a "video curtain" are an advantage. Their locations are predictable by an operator since they extend straight up.

During the alternating Mode 2, which is electronically switched into action, an extended volume is scanned and checked. A blue glove near or inside the virtual exclusion cuboidal volume causes a warning signal when its position is periodically checked.

Repeatedly switching scanning modes provides the safety attachment with a useful ability to warn the operator of closeness to the exclusion volume when in Mode 2 and an uncompromised ability to stop the machine in Mode 1 if the operator's hand enters the exclusion volume.

Although four cameras are required (for the example cuboidal protection volume), the invention has seeing redundancy and reads out the information four times faster than if the entire chip surface was read. The optical axis $103c$, $104c$, $105c$, and $106c$ of each camera defines one of a set of corner edges of the exclusion cuboid.

The processing method avoids three-dimensional computation of blue glove positions in real time.

Finally it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

We claim:

1. A bandsaw with a safety attachment for said bandsaw, the bandsaw having a work surface and a toothed blade with a cutting axis, the safety attachment comprising:
    at least four video cameras disposed around the blade and above the work surface of the bandsaw; and
    an actuator configured to decouple the blade and brake the blade,
    wherein each video camera of the four video cameras has an optical axis directed toward the work surface such that, for each one of the four video cameras, part of the blade occupies a position at a corner of a first rectangular area viewable by the camera,
    wherein each video camera is switchable so as to output an image of one of i) the first area and ii) a second rectangular area located within the first area, the second area including a part of the work surface bordered on a first opposite corner by the optical axis of the camera and bordered on a second opposite corner occupied by the part of the blade, and
    wherein the safety attachment further comprises a video signal processor, the video signal processor configured to receive and concurrently process video signals from all of said video cameras and configured to respond to a signal in any of the video signals indicating a presence of a colored object within any of the first area and the second area by producing and transmitting an actuator activating signal.

2. The bandsaw and safety attachment for the bandsaw as claimed in claim 1, wherein, in a first mode of operation, an exclusion cuboid is created by combining the second areas of all the four cameras,
    the exclusion cuboid having a base located on the work surface of the bandsaw, the base of the cuboid extending by a predetermined distance in each of four directions in a plan view of the position of the part of the blade, the four directions consisting of:
        a direction to an upper left in the plan view,
        a direction to an upper right in the plan view,
        a direction to a lower right in the plan view, and
        a direction to a lower left in the plan view,
    the exclusion cuboid also having sides defined at each of four corner edges by the optical axes of the four cameras, and the exclusion cuboid having a working height that includes an exposed portion of the blade inside the exclusion cuboid, the actuator activating signal of the video signal processor when in the first mode enabling the actuator in response to the presence of the colored object within the exclusion cuboid, and in a second mode of operation, a broader warning zone that comprises volumes of four quadrilateral pyramids extended outward beyond the sides of the exclusion cuboid created by combining the first areas of all the four cameras, the actuator activating signal of the video signal processor enabling when in the second mode one of an audible alarm and a flashing light.

3. The bandsaw and safety attachment as claimed in claim 2, wherein the safety attachment is configured to repeatedly perform a transition between the first mode of operation and the second mode of operation.

4. The bandsaw and safety attachment as claimed in claim 2, wherein the optical axis of each one of the cameras is parallel to the cutting axis of the blade.

5. The bandsaw and safety attachment as claimed in claim 2, wherein at least one of the optical axes of the four cameras is deflected along an axis between one of the cameras and the work surface by a mirror so that the one of the cameras is mounted horizontally.

6. The bandsaw and safety attachment as claimed in claim 2, wherein the safety attachment is configured to repeatedly perform a scan of all the four video cameras, and if, when in the first mode of operation, the colored object is detected in the scan, the blade is brought to a stop within 20 ms of a start of the scan.

* * * * *